(12) United States Patent
Langhoff et al.

(10) Patent No.: US 7,150,471 B2
(45) Date of Patent: Dec. 19, 2006

(54) CUSHIONED RESTRAINT SYSTEM

(75) Inventors: Richard V. Langhoff, Greensboro, NC (US); David M. Glorio, Göteborg (SE)

(73) Assignee: Volvo Trucks North America Inc., Greensboro, NC (US)

( * ) Notice: Subject to any disclaimer, the term of this patent is extended or adjusted under 35 U.S.C. 154(b) by 384 days.

(21) Appl. No.: 10/774,717

(22) Filed: Feb. 9, 2004

(65) Prior Publication Data

US 2005/0173909 A1 Aug. 11, 2005

(51) Int. Cl.
*B60R 21/06* (2006.01)
(52) U.S. Cl. .................. 280/749; 280/751; 297/488
(58) Field of Classification Search .............. 280/751, 280/749; 297/452.17, 188.04, 488; 5/703, 5/9.1, 10.1, 425, 118
See application file for complete search history.

(56) References Cited

U.S. PATENT DOCUMENTS

| | | | | |
|---|---|---|---|---|
| 2,131,211 A | * | 9/1938 | Bechik | .......................... 5/703 |
| 4,050,106 A | * | 9/1977 | Wolfe | .......................... 5/10.1 |
| 5,248,187 A | * | 9/1993 | Harrison | ..................... 297/482 |
| 5,375,879 A | * | 12/1994 | Williams et al. | ............ 280/749 |
| 5,536,042 A | * | 7/1996 | Williams et al. | ............ 280/749 |
| 5,690,355 A | | 11/1997 | Kleinberg | |
| 5,876,059 A | | 3/1999 | Kleinberg | |
| 6,082,815 A | * | 7/2000 | Xiromeritis et al. | ......... 297/124 |
| 6,367,839 B1 | * | 4/2002 | Langhoff | ..................... 280/751 |

* cited by examiner

*Primary Examiner*—Paul N. Dickson
*Assistant Examiner*—Timothy Wilheim
(74) *Attorney, Agent, or Firm*—Potomac Patent Group PLLC

(57) ABSTRACT

An occupant restraint system for protecting occupants in a compartment, such as a cab of a highway tractor or other vehicle. The system includes an interior trim panel having dual uses. The trim panel may be an elongated energy-absorbing element that forms, in a first position, at least a visually integral part of an interior wall of the compartment and, in a second position, a restraint at the front of a bunk for an occupant of the bunk. The restraint system includes a cushioned restraint attached to at least two straps, each strap being also attached to the compartment. In a first position, the cushioned restraint forms a visually integral portion of an interior surface of the compartment, and in a second position, the cushioned restraint is releasably attached to an end of the bunk such that the straps extend over the bunk and an occupant of the bunk is restrained by the cushioned restraint and the straps.

10 Claims, 3 Drawing Sheets

CUSHIONED RESTRAINT SYSTEM

BACKGROUND

This application relates to occupant restraint systems and more particularly to restraint systems for use in over-the-highway vehicles equipped with sleeping bunks.

Vehicles such as highway tractors commonly contain a sleeping compartment or berth containing one or more beds for use by non-driving occupants. U.S. regulations, for example, require each vehicle of this type to have a restraint system for each bed or sleeping area that is used when the vehicle is moving and a non-driving occupant is using the bed. Frequently used restraint systems include flexible harnesses or netting that restrict the space in which an occupant lies or can catch the occupant during an emergency.

In a typical arrangement, one end of the harness or netting is attached to the vehicle, the harness or netting is draped over the bunk, and the other end is releasably attached to the vehicle. This provides an enclosure over the bunk. The releasable attachment may be such as a seat-belt buckle having a buckle and tongue, of the type used by the automotive industry in passenger cars. One disadvantage of these types of prior art restraint systems is the lack of padding attached to the restraint system to prevent or minimize injury from a collision. Their primary purpose is to prevent the occupant from falling off the bunk during normal use, such as when the occupant is sleeping in the vehicle.

U.S. Pat. No. 5,690,355 and No. 5,876,059 describe a restraint system that includes sections that can be folded out from the rear wall of the cab of a vehicle and extended up from the bunk's front edge, which is to say, the forward-most end of the bunk in the normal direction of travel of the vehicle. The sections may be padded and provided with airbags, and a vertical section can be automatically extended by a spring when the bunk is prepared for use.

U.S. Pat. No. 5,375,879 describes a collapsible occupant restraint system, in which a net is fixedly mounted to a web framework that is slidably mounted to a plurality of webs extendable and retractable by retracting devices. The net and webbing is extendable from a stored collapsed position to an in-use position over a bed having buckles that lockingly engage a plurality of tongues mounted to the framework.

Restraint systems of the type described are generally bulky whereas sleeping compartments are usually small spaces. Efficient use of the space is desired. When not in use, the restraint systems are typically stored above the bunk bed. Storage above the bunk protrudes into the small space, making the sleeping compartment more confined. It would be desirable to store the restraint system in a manner that would not impact living space. It would be further desirable to provide a restraint system having a mechanism, such as a seatbelt-style retractor, for quick and easy storage when the restraint system is not in use.

Other types of restraint systems employ airbags which are installed in a horizontal and/or vertical deployment position with respect to the prone occupant in the bed or sleeping area. The airbags deploy when there is an impact or event sufficient to trigger the airbag mechanism. Airbag deployment most likely will not occur during emergency stops or other non-impact situations that could impart significant forward momentum or inertia to an occupant using the bed. Moreover, airbags are relatively complex systems and expensive to install compared to harness or netting restraint systems. Once an airbag has been deployed, maintenance is required to install a new airbag. Installation of the airbags usually requires the vehicle to be out of service until the maintenance is completed. Optionally, an air cushion is installed. The air cushion does not enclose a recumbent occupant but rather is positioned vertically with respect to the recumbent occupant.

U.S. Pat. No. 6,367,839 to Langhoff describes a restraint system that includes at least two flexible straps having one end attached to a selected one of the vehicle or the bunk, and a second end. At least one energy absorbent pad is attached to the straps in a position relative to the bunk for providing restraint and secondary collision protection. When not in use, the restraint system is conveniently stored so as to provide minimal impact on cab space.

Such prior restraint systems can be improved in various aspects.

SUMMARY

This application is directed to a restraint system for protecting an occupant of a bunk in a compartment, such as the cab of a vehicle. The system includes an interior trim panel, or bolster, having dual uses. The trim panel may be an elongated energy-absorbing element that forms, in a first position, at least a visually integral part of an interior wall of the compartment and, in a second position, a restraint at the front of a bunk for an occupant of the bunk.

In one aspect of the invention, a restraint system for protecting an occupant of a bunk in a compartment includes a cushioned restraint attached to at least two straps, each strap being also attached to the compartment. In a first position, the cushioned restraint forms a visually integral portion of an interior surface of the compartment, and in a second position, the cushioned restraint is releasably attached to an end of the bunk such that the straps extend over the bunk and an occupant of the bunk is restrained by the cushioned restraint and the straps.

The restraint system may include at least one latch for releasably attaching the cushioned restraint to the end of the bunk and strap retractors operable to retract flexible straps when the cushioned restraint is in the first position. In addition, the cushioned restraint, in the first position, may be retained in a recess in the interior surface of the compartment. The cushioned restraint may include a support bar extending through and protruding from it, with the protruding ends of the support bar being engageable with latches on the interior surface of the compartment such that the cushioned restraint is retained at the interior surface. A latch on the interior surface of the compartment may be a broom clip style latch. The compartment may be disposed in an over-the-highway tractor, and in the second position, the cushioned restraint may form a barrier between an occupant of the bunk and other portions of the compartment. The end of the bunk may be forward-most in a direction of travel of the compartment.

BRIEF DESCRIPTION OF THE DRAWINGS

The various features, objects, and advantages of the invention will be apparent from a reading of this description in conjunction with the drawings, in which like elements are identified by like reference characters and in which.

DETAILED DESCRIPTION

This application describes an improved restraint system that is integrated into the interior trim of a wall in a vehicle, yielding a simple, economical, and low-maintenance restraint system. Injuries from collisions are reduced and restraint of a non-driving occupant is provided. In addition, the effect on the sleeping compartment space is minimized, with the restraint system being conveniently and unobtrusively stored when the system is not in use.

Figure 1A:
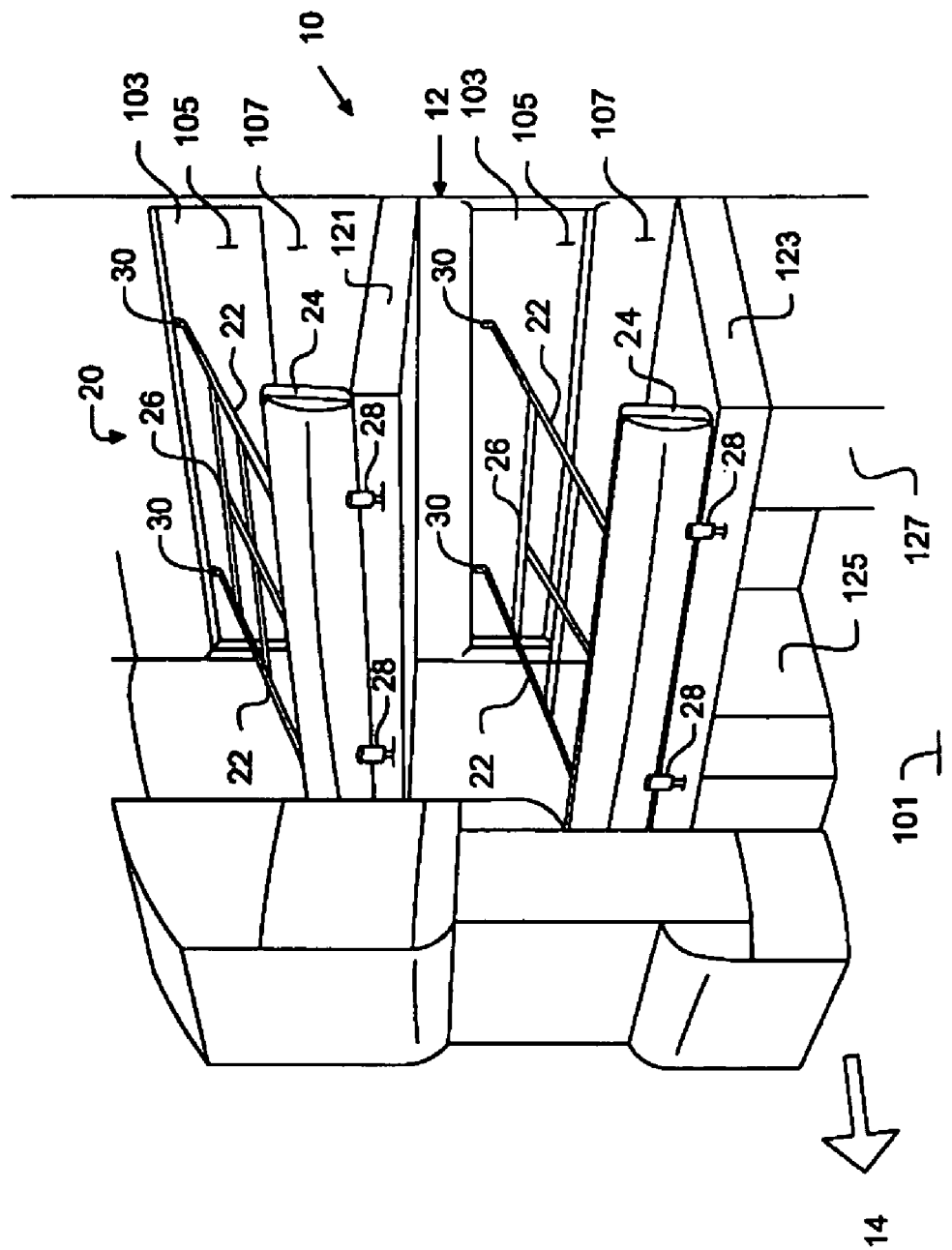
FIG. 1A is a perspective view showing deployed occupant restraint systems in accordance with Applicants' invention.
Figure 1B:
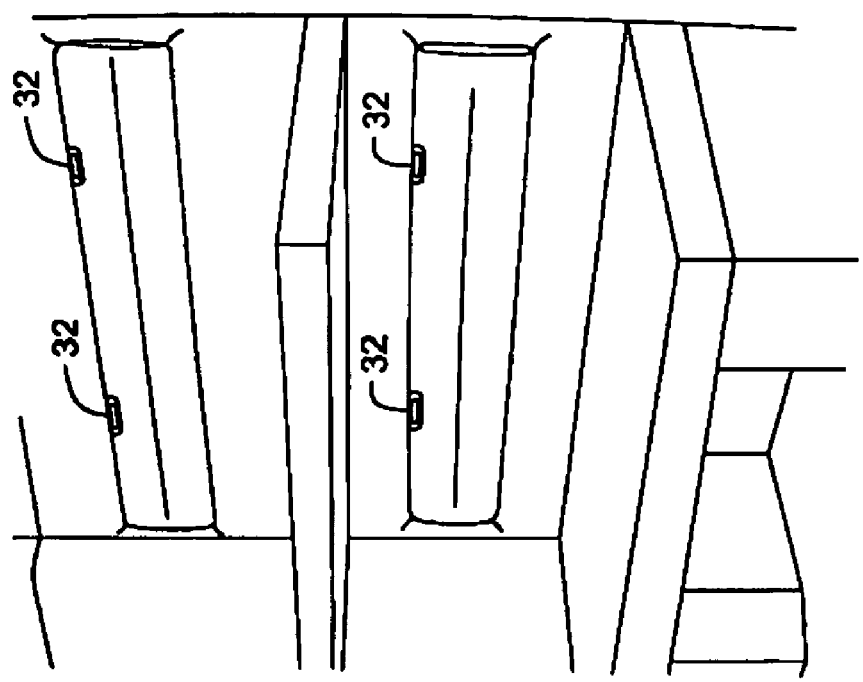
FIG. 1B is a perspective view showing stored occupant restraint systems in accordance with Applicants' invention.

Referring now to FIGS. 1A and 1B, there are shown two views of a compartment 10 having a bunk bed 12 such as might be provided in the cab of a highway tractor or other vehicle. The compartment 10 is formed in part by a floor 101 and a rear wall 103, from which the bunk bed 12 having upper bunk 121 and lower bunk 123 extend, for example by folding down from the rear wall 103. The side walls and ceiling of the compartment 10 are not shown for clarity. The normal travel direction of a vehicle within which the compartment 10 may be disposed is shown by arrow 14, and generally in this application, the words "front", "rear", and "side" may be considered with respect to this direction. It will be appreciated that although plural bunks 121, 123 are shown in FIGS. 1A, 1B, the bunk bed 12 may include only one bunk, which may be fixedly mounted to the floor 101. As described, for example, in U.S. Pat. No. 6,367,839 B1, the bunk may include a mattress that rests atop a frame borne by one or more supports fixed to the compartment 10. Two such supports 125, 127 are depicted in FIGS. 1A, 1B.

The compartment 10 has an occupant restraint system 20 for each bunk 121, 123, and the systems 20 are shown deployed, or in use, in FIG. 1A and stored in FIG. 1B. Each occupant restraint system 20 includes at least two straps 22 that extend from a wall of the compartment 10 to a padded or cushioned restraint 24, which is releasably attached to an end of a bunk. As shown in FIG. 1A, the straps 22 extend from the rear wall 103 of the compartment 10 to the cushioned restraints 24, which in turn are releasably attached to ends of the bunks 121, 123 that are forward-most in the normal direction of travel of the compartment.

It will be understood that the straps 22 could extend from a side wall of the compartment and that the cushioned restraint 24 could attach to a side end of a bunk, or the straps could extend from a rear wall of the compartment and the cushioned restraint could attach to a rear end of the bunk. In any case, the straps, when the system is deployed, extend over the mattress such that a person lying on the bunk is enclosed by a combination of the bunk, walls, straps, and cushioned restraint. In addition, the restraint systems 20 depicted in FIG. 1A may include additional straps 26 that contribute to enclosure of an occupant of the bunk. The straps can be of any dimension or thickness but should be of sufficient strength to meet applicable regulations pertaining to occupant restraint systems. The straps are preferably flexible to absorb some of the energy from the occupant during restraint and to provide easy storage when not in use. Examples of suitable straps include belts, ropes, and webbing, and examples of suitable flexible material include leather, rope, nylon, elastics, and fabric. Other straps and materials will be apparent to one skilled in the art.

As depicted in FIG. 1A, one end of each strap 22 is attached to the rear wall 103 and the other end of each strap 22 is attached to the cushioned restraint 24. These attachments may be made by any suitable means known to those skilled in the art. The cushioned restraint 24 is releasably attached to an end of a bunk 121, 123 by one or more latches 28, two of which are depicted for each restraint system 20 shown in FIG. 1A. A releasable latch 28 may include a buckle (not shown) and a tongue (not shown), with one of the buckle and tongue attached to the restraint 24 and the other of the buckle and tongue attached to the bunk 121, 123. The cushioned restraint 24 is attached to the straps 22, 26 and bunk 121, 123 in a position relative to the bunk such that, in use, the restraint provides restraint and secondary collision protection to a person lying on the bunk. Accordingly, the cushioned restraint 24 has any dimensions suitable for restraining an occupant of a bunk. For example, a restraint may be such that it extends 23–25 cm upward from the surface of a bunk's mattress, and if it is attachable at one of the longer ends of the bunk, the restraint may be about 2 m long. It will be appreciated, of course, that these dimensions are not exclusive.

The cushioned restraint 24 preferably comprises an energy-absorbent padding, such as expanded polypropylene foam, which is commonly used in bumpers of recent passenger cars, or urethane foam. The energy absorbent padding is also preferably resilient, and may be sewn to the straps 22, 26. Other suitable materials will be apparent to one skilled in the art, and it will be appreciated that the location and construction of the padding is not limited to that shown but may be located or maximized at critical areas, e.g., at head or chest areas of a bunk occupant. The padding, in addition to providing restraint, advantageously absorbs the impact of an occupant during an emergency.

The cushioned restraint 24 is preferably shaped as a padded interior trim panel or bolster that, at least in the stored position, is a visually integral component of the interior trim of the compartment 10. Accordingly, the trim panel or bolster may be advantageously decorative, which can be realized by upholstery in a manner similar to that of other trim panels in the compartment. As depicted in FIG. 1B, a restraint 24 and associated straps 22, 26 fit into a recess 105 formed by removing or re-shaping a portion of an interior panel 107 that is supported by the rear wall 103 that is better seen in FIG. 1A. To store a restraint 24 and straps 22, 26, the latches 28 are released and the enclosure provided by them is withdrawn into the recess 105. The straps 22, 26 may advantageously be retained in the recess 105, either directly behind the restraint 24 or behind and below the restraint. Once the straps 22, 26 are in the recess 105, they are retained by the restraint 24. In many compartments, interior trim panels are attached to vertical elements that are in turn attached to the walls. In many over-the-highway tractors, the vertical elements may be channels or beams having 7.5–10 cm rectangular cross-sections that are spaced apart by approximately 120 cm, and thus a pocket exists between the trim panel 107 and the wall 103 within which the straps 22, 26 can be manually placed when the restraint 24 is in the stored position.

As an alternative, retracting mechanisms 30 may be attached to the straps 22 and to a wall of the compartment 10, such as the rear wall 103 depicted in FIG. 1A. It will be appreciated that rather than being attached to a wall of the compartment, the retracting mechanisms 30 may be attached to the cushioned restraint 24, or even may be attached only to the straps. The retracting mechanisms 30 may be suitably dimensioned spring mechanisms, such as passenger car seatbelt-style retractors, extension coil springs, rubber-band-like straps sewn or otherwise attached to the webbings 22, 26, or other mechanisms that will be apparent to one skilled in the art. Such devices are described in U.S. Pat. No. 6,367,839 and manufactured by, for example, Indiana Mills and Autoliv.

The restraint 24 (and straps 22, 26) are retained in the recess 105 by a suitable retaining mechanism or mechanisms, such as an interference fit between the restraint 24 and the recess 105 in cooperation with forces imposed by one or more snap-in clips and possibly the retracting mechanisms 30, that can resist unwanted deployment, for example in an emergency. Handles 32 facilitate movement by a person, such as an occupant of the compartment 10, of the restraint and straps from the stored position to the deployed position, and thus a suitable handle is a notch, depression, recess or the like in the restraint 24 that permits a person to overcome the retaining mechanism(s). It will be appreciated that the restraint and straps can be visually integrated into the interior trim without requiring a recess in a wall of the compartment.

The cushioned restraint 24 may be reinforced, for example by at least one support bar inserted in the restraint. The support bar is preferably made from a hard, inflexible material, such as steel or rigid plastic, that extends through the entire length of the restraint 24. As a retaining mechanism, ends of a support bar may protrude from the cushioned portion of the restraint 24 and engage respective latches fixedly attached to the rear wall 103 and configured to receive the protruding ends. Such latches are preferably of a broom clip style configured to receive the ends of the support bar, and the support bar is secured by pushing the ends protruding from the cushioned portion of the restraint 24 into the latches. Such latches are described in U.S. Pat. No. 6,367,839 cited above. It will be apparent to those skilled in the art that other kinds of attachment mechanisms and latches, for example spring clips, buckles, etc., can be used, consistent with visual integration into the interior trim and resistance to unintentional deployment of the restraint 24.

Figure 2B:
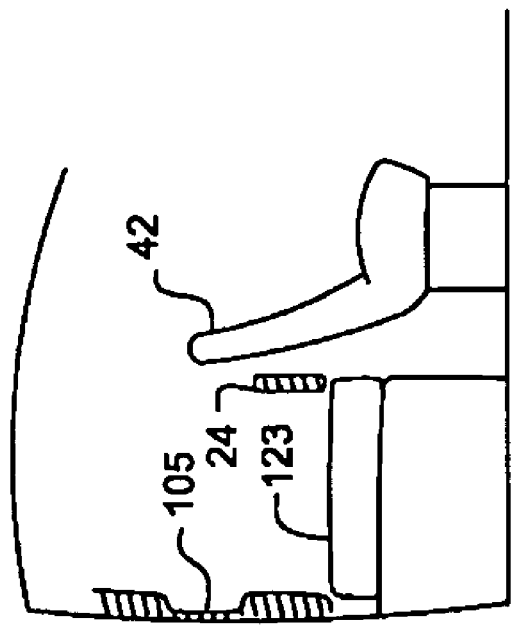
FIGS. 2A and 2B are cross-sectional views showing a deployed occupant restraint system in accordance with Applicants' invention.
Figure 2A:
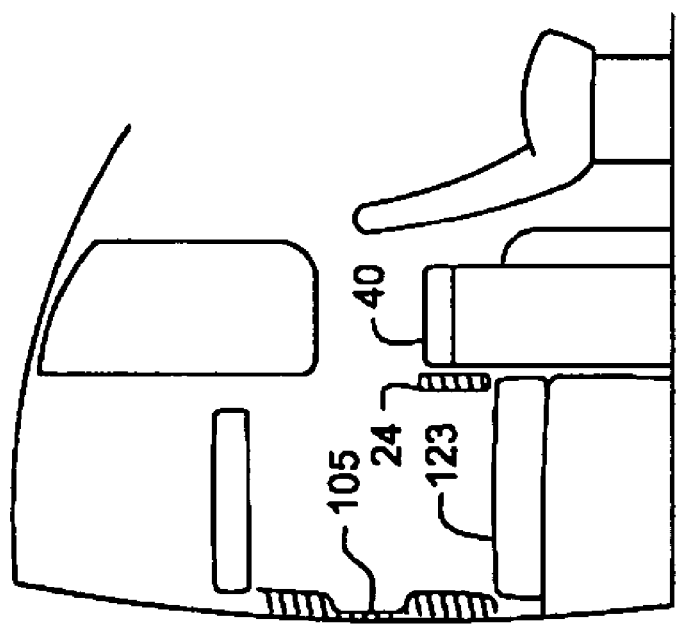

Applicants' occupant restraint system 20 advantageously can be visually integrated into compartments 10 having different configurations. FIGS. 2A, 2B depict two such different configurations, which are similar to those found in some current over-the-highway tractors. It will be appreciated that many different kinds of truck sleeper compartment are on the market, some having seatbacks and/or cabinets, walls, and the like that pose dangers to unrestrained occupants. Applicants' system is modular in that it can have any particular dimensions appropriate for the vehicle or other compartment in which it is used.

FIGS. 2A and 2B are cross-sections of compartments such as might be found in two different types of over-the-highway vehicles that depict Applicants' restraint system in the deployed position, with the straps not shown for clarity. As seen in FIGS. 2A, 2B, the cushioned restraint 24 is disposed at the front end of a bunk 123, and in that position, the restraint 24 forms a barrier between an occupant of the bunk 123 and other portions of the compartment, such as a storage cabinet 40 seen in FIG. 2A and the back of a seat 42 seen in FIG. 2B. These other portions of the compartment may include storage compartments, seat backs, appliances, control panels, etc. Applicants' invention provides a cushioned energy absorber irrespective of the nature of the other portions of the compartment. As described above, the restraint 24 is deployed from a stored position in a recess 105 in the rear wall of the compartment. This arrangement is advantageously efficient when the different compartments of the different types of vehicles are designed by simply moving the rear wall from one location to another with respect to the rest of the compartment.

Applicants' occupant restraint system protects occupants in a compartment of a vehicle and includes an interior trim panel having dual uses. In a first position, the trim panel forms at least a visually integrated part of an interior wall of the compartment, and in a second position, the trim panel forms a restraint at the front of a bunk for an occupant of the bunk. The panel may be stored in a recessed cavity in the interior wall and is advantageously shaped such that it appears to be simply a decorative part of the interior trim of the compartment. The interior trim itself may be constructed of materials similar to those described above for Applicants' cushioned restraint so that the interior trim can absorb energy from occupants in emergency situations, protecting the occupants against impacts with hard surfaces in the compartment.

Thus, Applicants' invention may be embodied in many different forms, not all of which are described above, and all such forms are contemplated to be within the scope of the invention.

It is emphasized that the terms "comprises" and "comprising", when used in this application, specify the presence of stated features, steps, or components and do not preclude the presence of one or more additional features, steps, components, or groups thereof.

The particular embodiments described above are merely illustrative and should not be considered restrictive in any way. The scope of Applicants' invention is determined by the following claims, and all variations and equivalents that fall within the range of the claims are intended to be embraced therein.

What is claimed is:

1. A restraint system for protecting an occupant of a bunk in a compartment, comprising a cushioned restraint attached to at least two straps, each strap being also attached to the compartment, wherein in a first position, the cushioned restraint forms a visually integral portion of an interior surface of the compartment with the straps hidden from view behind the cushioned restraint, and in a second position, the cushioned restraint is releasably attached to an end of the bunk such that the straps extend over the bunk and an occupant of the bunk is restrained by the cushioned restraint and the straps and protected from impacting hard surfaces in the vehicle.

2. The restraint system of claim 1, wherein the straps are flexible, and the restraint system further comprises at least one latch for releasably attaching the cushioned restraint to the end of the bunk and strap retractors operable to retract the straps when the cushioned restraint is in the first position.

3. The restraint system of claim 1, wherein in the first position the cushioned restraint is retained in a recess in the interior surface of the compartment.

4. The restraint system of claim 3, wherein the cushioned restraint includes a support bar extending through and protruding from the cushioned restraint, wherein protruding ends of the support bar are engageable with latches on the interior surface of the compartment such that the cushioned restraint is retained at the interior surface.

5. The restraint system of claim 4, wherein a latch on the interior surface of the compartment comprises a broom clip style latch.

6. The restraint system of claim 3, wherein the cushioned restraint includes at least one handle for moving the cushioned restraint from the first position to the second position.

7. The restraint system of claim 1, wherein the compartment is disposed in an over-the-highway tractor, and in the second position, the cushioned restraint forms a barrier between an occupant of the bunk and other portions of the compartment.

8. The restraint system of claim 1, wherein the end of the bunk is forward-most in a direction of travel of the compartment.

9. The restraint system of claim 1, wherein the cushioned restraint is shaped as a padded as a padded trim panel or bolster that, in the first position, forms a visually integral portion of an interior surface of the compartment.

10. The restraint system of claim 9, wherein the straps are retained in a pocket between the cushioned restraint in the first position and the compartment.

* * * * *